United States Patent Office 3,212,099
Patented Oct. 12, 1965

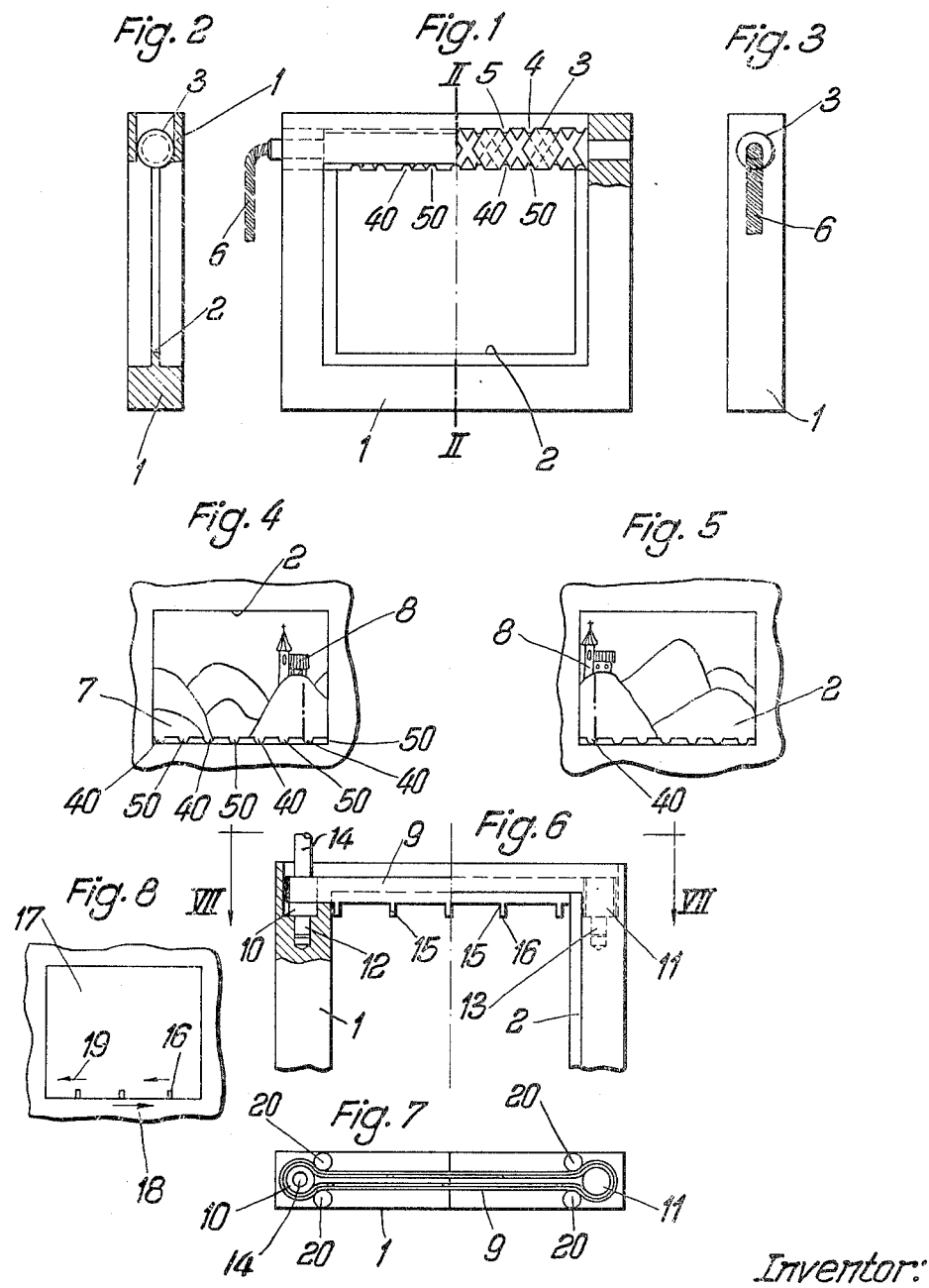

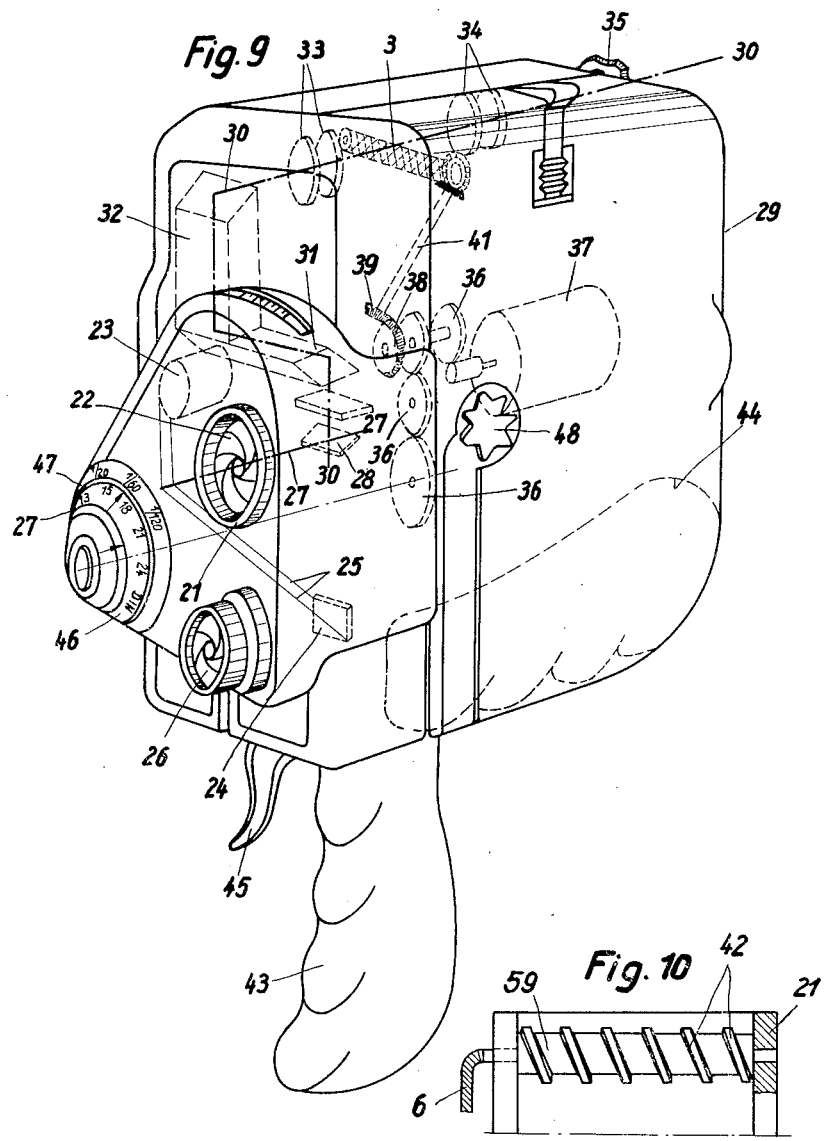

3,212,099
MOTION PICTURE CAMERA WITH MOVING
INDICATING MEANS IN VIEWFINDER FOR
TAKING PANORAMIC PICTURES
Adolf Gasser, Triesen, Liechtenstein, assignor to Contina
Bureaux- und Rechenmaschinenfabrik Aktiengesellschaft, Mauren, Furstentum, Liechtenstein
Filed Dec. 4, 1961, Ser. No. 156,645
Claims priority, application Austria, Dec. 5, 1960,
A 9,049/60
11 Claims. (Cl. 352—69)

The present invention is based on the recognition of a desire, particularly of beginners, to take panoramic pictures with a motion picture camera. For this purpose, the camera must either be rotated about an axis of rotation which is disposed adjacent to the camera itself and generally determined by the center of the screw thread used for mounting the motion picture camera on a stand, or to effect and arcuate movement of the camera by a turning of the body of the person holding the camera. Even for a more advanced amateur it is difficult, if not impossible, to reliably impart to the camera a rotary or arcuate movement of the aforesaid type at a speed sufficiently slow so as not to cause blurring of the individual pictures, yet not so slow that the utilization of the film is poor as a result of the panoramic sector being photographed requiring a much larger number of frames than is necessary.

The present invention has as its object the provision of a camera which is capable of satisfying the aforesaid.

Motion picture cameras embodying the invention are characterized by the provision of an indicating device for indicating the angular range through which the motion picture camera is to be rotated or arcuately moved per unit of time to, on one hand, permit the taking of distinct panoramic pictures at the frames per unit of time for which the camera has been set while on the other hand, permitting such photographing to be performed with the smallest possible total number of frames.

The indicating device according to the present invention is particularly suitable for being arranged in the viewfinder of a motion picture camera. To assume that the camera is moved at the desired panning speed, it is necessary only that a mark, which is moved at the speed of the rotary or arcuate movement of the cameras and is disposed in the plane of the viewfinder image, be maintained, during panning, in alignment with a predetermined portion of the viewfinder image.

Such mark or plurality of marks may be provided in various ways. A particularly simple indicating device will be obtained if the mark is formed by the intersection between a cylindrical surface and a helical recess opening into the same and formed in the cylinder defined by this surface. Two physiological effects are combined when an indicating device of this type is employed. If the eye is directed to a single point of the plane of the viewfinder image, only this point will be sharply seen by the eye whereas the remaining portion of the image will be somewhat blurred and are seen less distinctly. The second action is due to the fact that when viewing a portion of a rotating helix that portion gives the appearance of undergoing axial movement. Both effects are utilized in the present case since the eye is directed, e.g., to the bottom of the recess, which bottom appears as a point or line, depending on its depth and configuration so that this point or line travels at a speed which corresponds to the lead of the helix and its rotational movement per unit of time. Since the panoramic picture to be photographed cannot be relied upon to provide prominent portions which can be maintained at a fixed relation to the above-mentioned point or line, it is preferred to provide the groove-shaped recesses in a manner so as to form a plurality of helices resulting in a plurality of marks disposed adjacent one another. Thus, a plurality of points or lines travelling across the field as aforesaid are disposed one beside the other permitting that one thereof to be selected which is disposed under a prominent portion of the scene being viewed, whereafter the camera is moved in such a manner that the selected point remains below the chosen prominent portion. This will ensure that the camera is rotated or arcuately moved at the correct speed. It may be desirable to provide one or a plurality of additional recesses in the surface of the cylinder and having a lead opposite to the first mentioned groove. This will enable the rotary or arcuate movement of the camera in both directions without requiring a reversal of the direction of rotation of the cylinder. In each case that point or line is selected which is moving in the desired direction. By selection of an appropriate recess cross-section for example a triangular cross-sectional shape, the speed of the rotary or arcute camera movement at which pictures that are still sharp will be obtained at a given picture frequency can be readily determined. On the other hand, if a square or rectangle groove cross-section is chosen, the eye will see a base line rather than a point (such as the apex of a triangle). The length of such base line can be chosen such that if the prominent portion of the landscape is in registry with such base line, it is necessary only that the registry be maintained within the length of this line whereby that a range is obtained which gives the operator a certain amount of freedom in the making of pictures of the selected panoramic sector. In other words, the width of the recess in the cylinder corresponds to the range within which the speed of the rotary or arcuate movement of the camera results in a panoramic picture that is still sharp and at a given picture frequency requires a minimum of frames for a given panoramic sector. Another possibility resides in providing a mark in the form of a tooth of a preferably endless tape which extends around a pair of drums disposed outside the image mask of the viewfinder and the runs of which suitably cross each other in the plane of the viewfinder image. The teeth serve as marks, i.e. they can be caused to register with a prominent portion of the panoramic sector being viewed. In this embodiment it is also suitable to provide the tape with a plurality of similar teeth. Since the runs naturally move in opposite direction, special steps to provide marks moving in different directions are not required. The width of the teeth may correspond to the range within which a deviation can be allowed between a certain point of the tooth and the prominent portion of the panorama as, e.g., a person or object in the panorama.

In all cases, the movable parts of the motion picture camera which form or carry the mark are kinematically connected to the transmission of the camera so that changes in the picture frequency will result in a corresponding change of the speed at which the mark or marks move.

Embodiments of the invention are shown by way of example in the drawing, in which FIG. 1 is a greatly enlarged top plan view of that part of the indicating device which has been removed from the viewfinder.

FIG. 2 is a vertical transverse sectional view showing the device illustrated in FIG. 1 and taken on line II—II thereof.

FIG. 3 is a side elevation.

FIG. 4 shows the image appearing in the viewfinder and having a prominent portion which can be brought into a certain relation with the mark shown.

FIG. 5 shows the viewfinder image in an advanced phase of the rotary or arcuate movement of the camera.

FIG. 6 is a top plan view showing a modification of the device shown in FIG. 1.

FIG. 7 is a horizontal sectional top plan view showing the device of FIG. 6 and taken on line VII—VII thereof.

FIG. 8 shows the viewfinder image obtained with a device according to FIGS. 6 and 7.

FIG. 9 is a general view of a camera provided with a device according to the invention for making panoramic pictures.

FIG. 10 shows a device for providing a moving mark which is formed by a single screw thread carried by a rotary cylinder.

The frame 1 of the indicating device may consist, e.g., of plastic and contains the image mask 2, which coincides with the central plane of the frame 1 and confines the viewfinder image in the image plane of the viewfinder. On the frame 1 is mounted the cylindrical roller 3. Recesses 4, 5 consisting of helical grooves of the roller 3 and having different directions but the same lead open into the cylindrical surface of the cylinder 3. Each groove 4, 5 defines a bottom, the width of which corresponds to the range within which a variation of the speed of the rotary or arcuate movement of the motion picture camera is to be permitted. The bottom of the groove 4 is indicated at 40, that of the groove 5 at 50. The roller 3 is driven by a flexible shaft 6, which is connected to the transmission, not shown, in such a manner that the drive for the shaft 6 is derived from a transmission part moving at a speed which varies with changes in the picture frequency.

FIG. 4 shows the appearance of the viewfinder image. It shows a mountain landscape 7 with a small summit church 8 as a prominent portion of the landscape. Owing to the inversion in the eyepiece of the viewfinder, that portion of the roller 3 which protrudes over the image mask 2 toward the viewfinder image appears in the lower portion of the viewfinder image, where the lines 40, 50 formed by the bottom of the grooves 4, 5 are distinctly apparent. It may be assumed that the camera is rotated or arcuately moved from the right to left. In this connection a movement of the camera mounted on a stand about the common axis of rotation of the camera and the stand is hereinafter termed a rotation whereas an arcuate movement will be one that is effected by the body or the hands or arms of the operator. Depending on the position of the prominent portion 8, the lines 40 below the summit church will be selected in order to establish a registry between both portions of the image, e.g., on an imaginary vertical line. Now a rotary or arcuate movement is imparted to the camera in such a manner that the point 40 on which the eye is directed remains constantly under the church 8. In this way the desired panoramic sector is photographed. FIG. 5 shows the end of the panoramic shot where the summit church 8 is seen to lie close to the left-hand edge of the image mask 2 and the selected point or selected line constituting the mark used in photographing the panoramic sector lies vertically under this church.

A somewhat different embodiment is shown in FIGS. 6 to 8. The frame 1 again contains an image mask 2, the central plane of which coincides with the image plane of the viewfinder system. Instead of a roller, an endless tape 9 is now provided, which extends around the drums 10, 11 mounted by means of the journals 12, 13 in the frame 1. The drive means for one of the two drums is indicated at 14. The drive shaft may again be flexible or may consist of rigid elements. It is so connected to a transmission part that the tape 9 is moved in dependence on the picture frequency. The tape 9 has teeth 15, the ends 16 of which are distinctly apparent in the viewfinder image 17 of FIG. 8. Those teeth which are nearer to the viewer move in a direction 18, which is opposed to the direction 19 of the teeth which are more remote from the viewer. It is suitable to provide rollers 20, which control the tape 9 adjacent to the viewfinder image 17 so that its runs almost contact each other and the teeth moving in opposite directions appear to lie almost in the same plane. This facilitates the establishment of registry of the teeth with prominent portions of the viewfinder image.

It is within the nature of the invention that the same is not restricted to the illustrative embodiments. There are various ways of providing marks in the gate of the viewfinder and to move them at the required speed. It is not essential to accommodate the indicating device in the viewfinder. The indicating device may be accommodated in another portion of the camera or may be designed to be fitted on the camera body. In such case a coupling stub portion of the transmission must be disposed at the position of the fitted indicating device to ensure the movement of the mark with the required speed. Since the panoramic image is shown in the viewfinder on a reduced scale, however, the viewfinder image is especially suitable for accommodating the marks. Further, the viewfinder provides a safe accommodation of the device. In addition, the optical system of the viewfinder ensures that the viewfinder image will always be brighter than the image seen through a frame so that this arrangement of the indicating device has proved particularly desirable.

FIG. 9 is a perspective general view of the camera. In addition to the previously mentioned parts of the camera, which are visible from the outside, the lens unit, which has not been described hereinbefore, is illustrated. This unit consists of the lens system 21 and a photoelectrically controlled diaphragm 22 incorporated in this lens system. A battery 23 for use with a photoelectric device including a photoconductor 24 is shown disposed above the lens system and connected by a conductor 25 to the photoconductor 24. The photoconductor 24 may be replaced by a photocell, which controls the electrically operated diaphragm 22 through the intermediary of a control system in which the control current is amplified. A pre-arranged diaphragm 26 disposed in front of the light-responsive device 24 is varied in dependence on the picture frequency so as to increase its aperture when the picture frequency is reduced. This causes more light to fall on the photoconductor or the photoelectric cell 24 so that the aperture of the lens diaphragm 22 is reduced in correspondence with the increase in exposure time caused by the reduction of the picture frequency.

The path of the light passing through the lens system 21 coincides first with the optical axis of the lens system 21, and when the tiltable mirror 28 is tilted upwardly, reaches the light-sensitive film disposed in the replaceable magazine 29. When the mirror 28, the movement of which is derived from the transmission of the camera, is in the tilted position shown, it will deflect the light out of the axis 27—27 into the direction 30—30 so that the light is transmitted by the prisms 31 and 32, an optical system 33, 34 in the viewfinder and the eyepiece 35 to become visible to the eye in the interval between two exposures of the film. The film, not shown, the transmission 36 of the camera and the shutter, not shown, for the lens system 21 are driven by a motor 37, which is energized by a battery, not shown, which may be accommodated, e.g., in the handle 43 of the camera. The transmission 36 comprises a bevel gear 38 disposed at a point which, when viewed from the motor 37, lies behind the means, not shown, for changing the transmission ratios so as to change the number of frames of the film per unit of time. The bevel gear 38 is in mesh with a mating bevel gear 39, which, by means of a shaft portion 41, drives the roller 3 shown in FIGS. 1 to 3, or the drive shaft 10 of the tape 9 shown in FIGS. 6 to 8. A roller 59 having a single helical rib 42, to provide marks which are moved in dependence on the transmission ratio of the transmission 36, is shown in FIG. 10. The handle 43 of the camera can be swung into the recess 44. A handle 45 similar to the trigger of a gun serves for releasing or stopping the transmission 36. A setting means 46 is set in dependence on the sensitivity of the film whereas the exposure time is set at 47. A drive wheel 48 has associated with it a mating wheel, not shown, on the replaceable magazine 29 and serves for driving the film in the magazine by means of the transmission 36 when the position of the magazine relative to the camera housing has been changed.

I claim:

1. In a motion picture camera having a means for adjusting the number of frames exposed per second, in combination, indicating means; means mounting said indicating means at a location where said indicating means can be viewed by the operator simultaneously with the viewing of the subject which is photographed; and the means operatively connected to said indicating means for moving the latter across the field of view seen by the operator at a speed corresponding to the number of frames exposed per second, so that by maintaining a part of the subject which is viewed in alignment with said indicating means the camera can be panned by the operator at a speed which will assure sharp images.

2. In a motion picture camera, in combination, selecting means for selecting one of a plurality of speed settings at which different numbers of frames are respectively exposed per second; indicating means located in a position where said indicating means is viewed in the same field of view as the subject which is photographed; and drive means operatively connected to said indicating means for moving the latter across the field of view at a speed determined by the selected speed setting so that by maintaining a part of the viewed subject in alignment with said indicating means the camera may be panned while assuring sharp images.

3. In a motion picture camera as recited in claim 2, said indicating means being in the form of a rotary cylindrical member formed in its exterior surface with oppositely directed helical grooves portions of which are visible in the viewing field and move in opposite directions thereacross so that a selected portion of a selected groove can be aligned with a selected part of the viewed subject.

4. In a motion picture camera as recited in claim 3, each groove having a width corresponding to the range of permissible variation between the movement of the selected groove portion across the viewing field and the selected part of the viewed subject aligned therewith, so that as long as said selected part of the viewed subject is maintained in alignment with any part of the selected groove portion a sharp image will result.

5. In a camera as recited in claim 2, said indicating means being in the form of an endless band having projections the tips of which are visible in the viewing field with the courses of said band and thus the tips projecting therefrom moving across the viewing field in opposite directions, so that by aligning a selected part of the viewed image with a selected tip moving in a selected direction sharp images may be made while panning the camera in a selected direction.

6. In a camera as recited in claim 5, each tip having a width corresponding to the permissible variation in the alignment of the selected part of the viewed subject and the selected tip beyond which the images will not remain sharp, so that by maintaining the selected part of the viewed image in alignment with any part of the selected tip sharp images will result.

7. In a camera as recited in claim 2, said indicating means being in the form of a cylindrical roller carrying a raised helical thread portions of which appear to move across the field of view during rotation of said roller, so that by maintaining a selected part of the viewed subject in alignment with a selected portion of said thread panning of the camera at an agular speed which will guarantee sharp images is assured, said thread having a width corresponding to the permissible variation in the alignment of the selected part of the image and the selected portion of the thread beyond which the images will not be sharp, so that by maintaining the selected part of the image in alignment with any part of the selected portion of the thread a sharp image will result.

8. In a motion picture camera adapted to expose a predetermined number of frames per second, in combination, support means; indicating means carried by said support means at a position where said indicating means is visible together with the subject which is photographed; drive means operatively connected to said indicating means for moving the latter across the field of view at a speed which is in a predetermined relationship to the number of frames exposed per second, said indicating means having a width corresponding to the permissible variation in the alignment between the selected part of the subject and the selected portion of the indicating means while still guaranteeing sharp images, so that by maintaining the selected part of the viewed subject in alignment with any part of the selected portion of the indicating means sharp images will be guaranteed during panning of the camera.

9. In a camera as recited in claim 8, said indicating means being in the form of a roller formed with a helical groove a portion of which is selected to be maintained in alignment with the selected part of the viewed subject.

10. In a camera as recited in claim 8, said indicating means being in the form of a roller having a raised helical thread a portion of which is selected to be maintained in alignment with the selected part of the viewed subject.

11. In a camera as recited in claim 8, said indicating means being in the form of an endless band having projections the tips of which are visible to the operator so that a selected tip is maintained in alignment with the selected part of the viewed subject.

References Cited by the Examiner

UNITED STATES PATENTS

| 1,171,877 | 2/16 | Phillips | 352—69 |
| 1,773,309 | 8/30 | Hugershoff | 352—171 X |
| 2,924,143 | 2/60 | Kaprelian | 88—16 |

FOREIGN PATENTS 825,384  12/37  France.

LEO SMILOW, *Primary Examiner.*

G. Y. CUSTER, *Examiner.*